United States Patent
Mock et al.

[19]

[11] Patent Number: 5,990,806
[45] Date of Patent: Nov. 23, 1999

[54] METHOD AND APPARATUS FOR EFFICIENT REVERSE CHANNEL UTILIZATION IN A TWO-WAY MESSAGING SYSTEM

[75] Inventors: Von Alan Mock, Boynton Beach; Eric Thomas Eaton, Lake Worth, both of Fla.

[73] Assignee: Motorola, Schaumburg, Ill.

[21] Appl. No.: 08/947,830

[22] Filed: Oct. 8, 1997

[51] Int. Cl.[6] .................................................. G08B 5/22
[52] U.S. Cl. ................ 340/825.54; 370/348; 340/825.44
[58] Field of Search .................... 340/825.44, 825.47, 340/825.52, 825.54, 825.51, 825.48, 825.5, 994, 998, 336, 348, 349, 473, 509; 375/267, 347, 57, 58; 455/186.1, 31.3, 456, 457, 38.1, 33.2; 370/337, 345, 442, 443

[56] References Cited

U.S. PATENT DOCUMENTS

| | | | |
|---|---|---|---|
| 4,646,082 | 2/1987 | Engel et al. ........................ | 340/825.54 |
| 5,124,697 | 6/1992 | Moore ................................ | 340/825.44 |
| 5,502,722 | 3/1996 | Fulghum ............................ | 370/69.1 |
| 5,509,015 | 4/1996 | Tiedemann, Jr. et al. ............. | 370/95.3 |
| 5,596,318 | 1/1997 | Mitchell ............................. | 340/825.44 |
| 5,673,256 | 9/1997 | Maine ................................ | 370/271 |
| 5,729,540 | 3/1998 | Wegrzyn ............................ | 370/336 |
| 5,740,167 | 4/1998 | Taketsugu et al. .................. | 370/337 |
| 5,790,535 | 8/1998 | Kou ................................... | 370/337 |
| 5,790,551 | 8/1998 | Chan .................................. | 370/458 |
| 5,914,950 | 6/1999 | Tiedemann et al. ................. | 370/348 |

*Primary Examiner*—Brian Zimmerman
*Assistant Examiner*—Jean B. Jeanglaude
*Attorney, Agent, or Firm*—Pablo Meles

[57] ABSTRACT

A selective call transceiver (122) includes a receiver (303) and a transmitter (301) coupled to a processor (308) serving as a decoder and an encoder. The processor is programmed to receive an input requiring the selective call receiver to request a reserved time assignment from a system controller (11) for a transmission of unscheduled information, the request to be sent on a reverse or inbound channel. The processor further determines whether a scheduled transmission is pending for transmission on the reverse channel during a scheduled time slot and sends the unscheduled information and an indicia of the scheduled transmission during the scheduled time slot if there is a scheduled transmission pending.

18 Claims, 6 Drawing Sheets

METHOD AND APPARATUS FOR EFFICIENT REVERSE CHANNEL UTILIZATION IN A TWO-WAY MESSAGING SYSTEM

FIELD OF THE INVENTION

This invention relates in general to selective call communication systems and more specifically to an two-way messaging system having an efficient reverse or inbound channel.

BACKGROUND OF THE INVENTION

Contemporary selective call systems, e.g., paging systems, employ messaging schemes that can typically deliver voice, numeric, or alphanumeric messages to subscribers. Recently, Motorola's FLEX™ protocol is becoming accepted as a world-wide standard protocol for selective call communication. Additionally, Motorola provides a ReFleX™ protocol that allows selective call systems to handle two-way communication, e.g., acknowledge-back (Ack-Back) messaging, with portable transceivers, such as the Motorola Personal Messaging Unit (PMU) named Tango®. In a ReFlex™ communication system, a central system can send wireless messages to a portable transceiver unit such as a PMU, and the PMU can send both scheduled and unscheduled wireless messages to the central system.

A two-way communication system such as Motorola's ReFlex™ communication system, allows a central system to verify that a portable transceiver unit (portable unit) received a wireless message transmitted by the central system to the portable unit. A confirmation message, e.g., an Ack-Back response message, sent from the portable unit back to the central system in response to having received a wireless message therefrom provides an affirmative confirmation back to the central system that the wireless message was reliably delivered and received by the portable unit. This handshake messaging, i.e., sending a confirmation response message back to a central system for each wireless message received by a portable unit, can significantly enhance the reliability of communication in a selective call system. However, the increased number of transmitted messages due to the handshake messaging increases the message communication and message processing time delays in the selective call system. This added delay tends to reduce the message communication efficiency of the selective call system, which may not be acceptable under certain operational conditions of the selective call system, as will be discussed below.

Under certain operational conditions in the selective call system, for example, messaging traffic may be high for an available message communication throughput capacity for the selective call system. Any significant additional message traffic can detrimentally affect the operational efficiency of system resources, such as limited by a messaging throughput capacity of a wireless communication channel, or limited by messaging throughput capacity of communication links, or limited by an operational efficiency of central system resources such as near-full memory queues or overloading of tasks for devices that handle messaging operations, or a combination of all of the above communication phenomena.

Generally, the number of messages that a selective call system can handle during peak communication traffic periods constrains the number of total customers that can be serviced by the selective call system. The total number of customers handled by the selective call system typically determines the commercial viability of the selective call system.

Furthermore, although conventional Ack-Back messaging can maintain a high level of reliability in message communication by sending an immediate Ack-Back message in response to every wireless message received by a portable unit, under certain messaging conditions transmitting an immediate Ack-Back message response for every wireless message received by a portable unit may not be commercially practicable.

Specifically, to enhance the likelihood of commercial viability of a selective call system the messaging throughput capacity of the selective call system should be as high as possible. Normally, a selective call system has a one-way messaging throughput capacity that is constrained by the maximum number of wireless messages that the central system can transmit to the portable units over a unit of time. The selective call system also has a two-way messaging throughput capacity that is constrained by the maximum number of wireless messages that the central system can transmit to portable units while the portable units send Ack-Back messages back to the central system in response to receiving the wireless messages therefrom over a unit of time. For a particular selective call system, the one-way messaging throughput capacity is normally higher than the two-way messaging throughput capacity. Therefore, to enhance the likelihood of commercial viability of a selective call system the messaging throughput capacity of the selective call system should be as high as possible, preferably approaching the one-way messaging throughput capacity that is higher than the two-way messaging throughput capacity.

As an example, under high communication traffic conditions the selective call system's total messaging throughput capacity can be significantly constrained by the messaging throughput capacity consumed by the portable units sending Ack-Back response messages to the central system. The additional communication traffic and processing time delays due to the Ack-Back response messages may reduce the total number of wireless messages that can be delivered by the selective call system during the high communication traffic conditions.

Furthermore, acknowledgement messages as currently delivered in two-way messaging systems are unduly lengthy for the information they are conveying. Additionally, in current two-way synchronous paging protocols, all messages need to be scheduled on the reverse or inbound channel, even "unscheduled information" initiated by a user. The scheduling of "unscheduled information" creates additional traffic on both inbound and outbound channels that effectively reduced channel capacity.

Thus, what is needed is a method and apparatus in an acknowledge-back selective call system for providing the efficient use of the reverse channel that will take advantage of the minimal information required in acknowledgements and further reduce the inefficiencies involved with unscheduled information.

SUMMARY OF THE INVENTION

In a first aspect of the present invention, a method of efficient reverse channel transmissions comprises the steps at a subscriber unit of receiving an input requiring the subscriber unit to request a reserved time assignment from a controller for a transmission of unscheduled information, the request to be sent on a reverse channel. Then the subscriber unit determines whether a scheduled transmission is pending for transmission on the reverse channel during a scheduled time slot. If a scheduled transmission is pending, the subscriber unit sends the unscheduled information and an indicia of the scheduled transmission during the scheduled time slot.

In another aspect of the present invention, a method of efficient reverse channel utilization in a communication system having a plurality of subscriber units comprises the steps at a two-way messaging controller of awaiting scheduled transmissions from the plurality of subscriber units and receiving unscheduled information and an indicia of the scheduled transmission during a scheduled time slot from at least one of the plurality of subscriber units. The controller would then recognize the unscheduled information upon decoding the indicia of the scheduled transmission.

In yet another aspect of the present invention, a selective call transceiver comprises a receiver having a decoder, a transmitter having an encoder and a processor coupled to the decoder and the encoder. The processor is preferably programmed to receive an input requiring the selective call receiver to request a reserved time assignment from a system controller for a transmission of unscheduled information, the request to be sent on a reverse channel. The processor further determines whether a scheduled transmission is pending for transmission on the reverse channel during a scheduled time slot and sends the unscheduled information and an indicia of the scheduled transmission during the scheduled time slot if there is a scheduled transmission pending.

DETAILED DESCRIPTION

Figure 1:
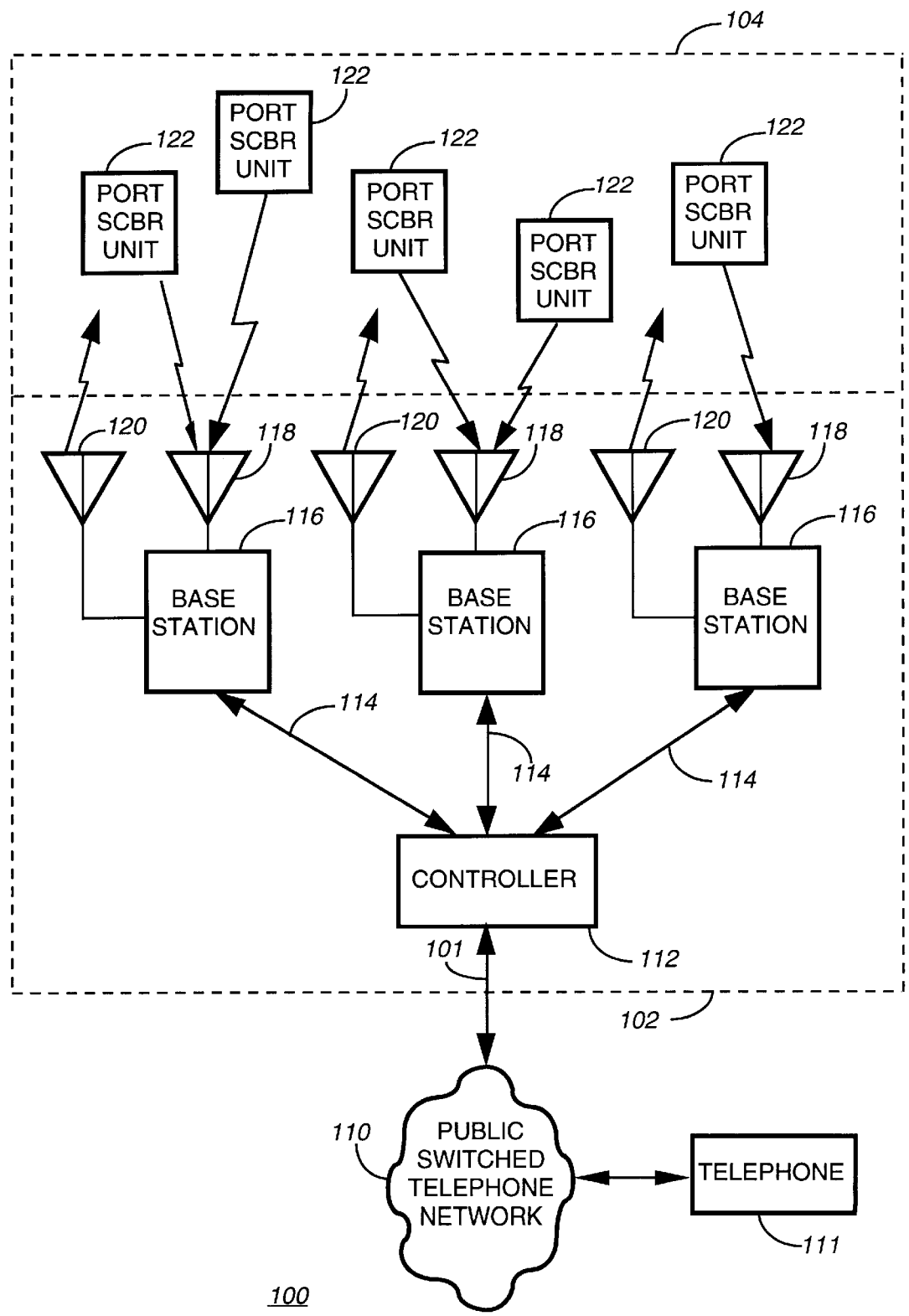
FIG. 1 is block diagram of a communication system in accordance with the present invention.

Referring to FIG. 1, a block diagram of a communication system 100 in accordance with the present invention comprises a fixed portion 102 and a portable portion 104. The fixed portion 102 comprises a plurality of conventional base transceivers which are base stations 116 coupled by communication links 114 to a controller 112 for controlling the base stations 116. The hardware of the controller 112 is preferably similar to the Wireless Messaging Gateway (WMG™) Administrator! messaging terminal manufactured by Motorola, Inc. of Schaumburg, Ill. The hardware of the base stations 116 is preferably similar to the RF-Orchestra!™ transmitter manufactured by Motorola, Inc. of Schaumburg, Ill. Other similar hardware can be utilized as well for the controller 112 and base stations 116. The controller 112 comprises a plurality of firmware elements in accordance with the present invention, as will be described further below.

Each of the base stations 116 transmits radio signals to the portable portion 104 comprising a plurality of portable subscriber units 122 via a transmitting antenna 120. The base stations 116 each receive radio signals from the plurality of portable subscriber units 122 via a receiving antenna 118 coupled to a base receiver within the base station (see FIG. 2). The radio signals comprise selective call addresses and messages transmitted to the portable subscriber units 122 and acknowledgments received from the portable subscriber units 122. It will be appreciated that the portable subscriber units 122 can also originate messages other than acknowledgments. The controller 112 preferably is coupled to a conventional telephone 111 via telephone links 101 and a public switched telephone network (PSTN) 110 for receiving selective call originations therefrom. Selective call originations comprising voice and data messages from the PSTN 110 can be generated, for example, from the conventional telephone 111 coupled to the PSTN 110 in a manner that is well known in the art.

Data and control transmissions between the base stations 116 and the portable subscriber units 122 preferably utilize a well-known digital selective call signaling protocol, such as the Motorola FLEX™ family of protocols. It will be appreciated that other similar protocols can be utilized as well. These protocols utilize well-known error detection and error correction techniques and are therefore tolerant to bit errors occurring during transmission, provided that the bit errors are not too numerous in any one code word.

Outbound channel transmissions comprising data and control signals from the base stations 116 preferably utilize two- and four-level frequency shift keyed (FSK) modulation, operating at sixteen-hundred or thirty-two-hundred or sixty-four hundred symbols-per-second (sps), depending on traffic requirements and system transmission gain. Inbound channel transmissions from the portable subscriber units 122 to the base stations 116 preferably utilize four-level FSK modulation at a rate of 800, 1600, 6400 or ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency. It will be appreciated that, alternatively, frequency division duplex (FDD) can be utilized as well for the outbound and/or inbound channels.

U.S. Pat. No. 4,875,038 to Siwiak et al., which describes a prior acknowledge-back selective call communication system, is hereby incorporated herein by reference. For further information on the operation and structure of an acknowledge-back selective call communication system, please refer to the Siwiak et al. patent.

Figure 2:
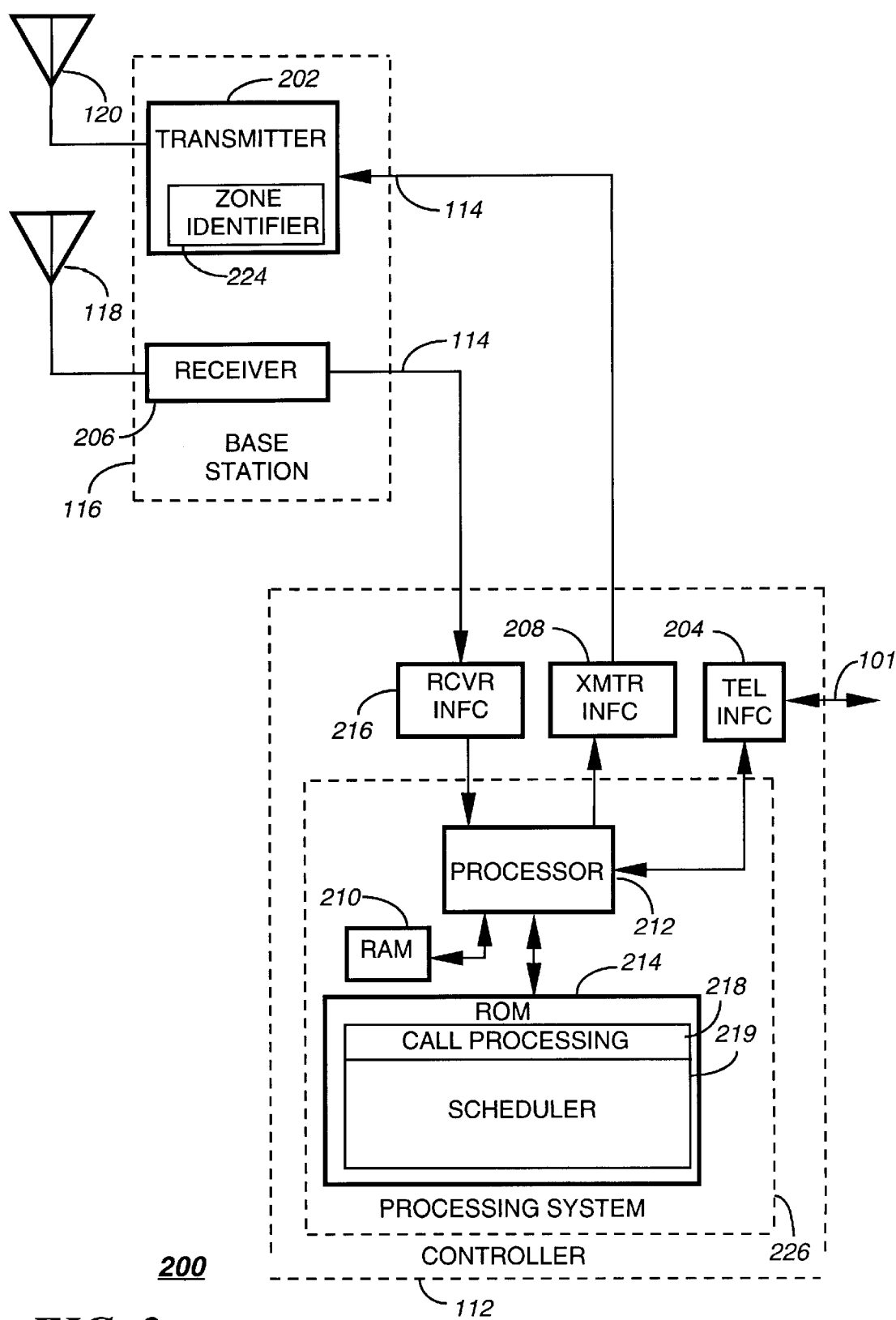
FIG. 2 is an electrical block diagram of portions of a controller and base station in accordance with the present invention.

Referring to FIG. 2, an electrical block diagram 200 of portions of the controller 112 and base station 116 in accordance with the present invention shows that the controller 112 comprises a processing system 226 for directing operation of the controller 112. The processing system 226 includes a processor 212 that is preferably coupled through a transmitter interface 208 to a transmitter 202, both utilizing conventional techniques well known in the art. The transmitter 202 preferably transmits two- and four-level FSK data messages to the portable subscriber units 122. Also preferably, the transmitter 202 comprises a zone or location identifier 224 stored within a non-volatile memory thereof for identifying a coverage zone in which the transmitter operates. The location identifier 224 is preferably a non-zero value unique to the zone in which the transmitter 202 is located and may be used for color code identification.

The processor 212 is also coupled through a conventional receiver interface 216 to at least one acknowledgment receiver 206 using conventional binary FSK demodulation. The acknowledgment receiver 206 can be collocated with the base stations 116, as implied in FIG. 2, but preferably is positioned remote from the base stations 116 to avoid interference from the transmitter 202. Additionally, a number of remote acknowledgment receivers 206 could be used and coupled to the receiver interface 216. The acknowledgment receiver 206 is for receiving one or more acknowledgments from the plurality of portable subscriber units 122. Additionally, the receiver 206 could receive other critical data from the portable subscriber units including but not limited to zone identifiers, color codes, and RSSI measurements. In addition, the processor 212 is coupled through a telephone interface 204 to the telephone links 101 and thence to the PSTN 110 (see FIG. 1) for receiving message originations therefrom.

The processor 212 is coupled to a random access memory (RAM) 210 for storing messages to be transmitted to the portable subscriber units 122, and additionally and/or optionally for storing messages received from the portable subscriber units 122. The RAM 210 may also store a database of the plurality of portable subscriber units. The processor 212 also is coupled to a read-only memory (ROM) 214 comprising firmware elements for use by the processor 212. It will be appreciated that other types of memory, e.g., electrically erasable programmable ROM (EEPROM) or magnetic disk memory, can be utilized as well for the ROM 214 or RAM 210. It will be further appreciated that the RAM 210 and the ROM 214, singly or in combination, can be integrated as a contiguous portion of the processor 212. Preferably, the processing system 226 is a conventional, commercially available computer system such as a VME Sparc processor system manufactured by Sun Microsystems, Inc. It will be appreciated that other similar processors can be utilized as well for the processor system 226, and that additional processor systems of the same or alternative type can be added as required to handle the processing requirements of the controller 112. The firmware elements of the controller 112 preferably comprise a call processing element 218 for processing calls in a manner well known in the art. Further, the ROM 214 preferably contains additional firmware elements including a scheduler element 219. The call processing element 218 receives a plurality of messages for the subsequent wireless transmission to a plurality of portable subscribers units. The scheduler element 219 may assign a message sequence number (MSN) to each of the plurality of messages and may also direct a targeted unit of the plurality of portable subscriber units to listen to a particular channel or communication resource to make carrier to interference plus noise measurements as will be described in further detail.

The present invention preferably provides a method of efficient reverse channel utilization in a communication system having a plurality of subscriber units wherein at least one of the plurality of subscriber units waits to determine whether a scheduled transmission is pending for transmission on a reverse channel during a scheduled time slot before transmitting unscheduled information. In this manner the communication system uses the two-way messaging controller 112 by awaiting scheduled transmissions from the plurality of subscriber units and receiving unscheduled information and an indicia of the scheduled transmission during a scheduled time slot from the at least one of the plurality of subscriber units. It should be noted that the mere fact that a subscriber unit is responding during a scheduled time slot with unscheduled information can provide an indicia of the scheduled transmission. In other words, if an scheduled acknowledgement signal is expected at a scheduled time slot from a subscriber unit and only unscheduled information is received at a system controller, the mere fact that any information is transmitted and received during the scheduled time slot could serve as the indicia of the acknowledgment signal. Preferably, the controller 112 recognizes the unscheduled information upon decoding the indicia of the scheduled transmission whether it be in the form an assigned bit or otherwise. The controller 112 may also receive a request for a reserved time assignment for unscheduled information and have the transmitter 202 transmit an assigned time slot to the at least one of the plurality of subscriber units. The controller 112 would then receive the unscheduled information during the assigned time slot if there is no scheduled transmission pending at the subscriber unit.

Figure 3:
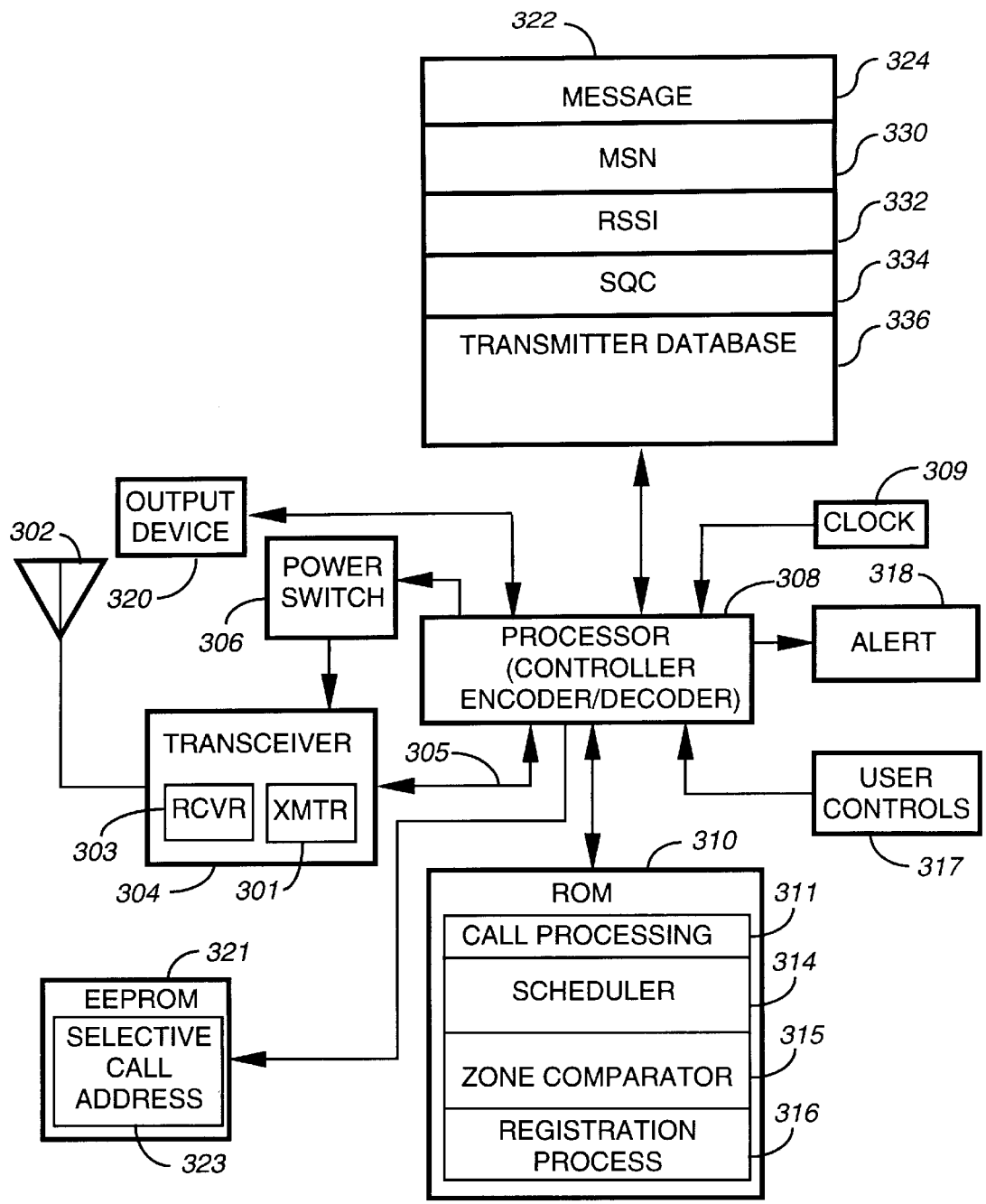
FIG. 3 is an electrical block diagram of a portable subscriber unit in accordance with the present invention.

Referring to FIG. 3, an electrical block diagram depicts the portable subscriber unit 122 in accordance with the present invention. The portable subscriber unit 122 comprises a transceiver antenna 302 for transmitting and intercepting radio signals to and from the base stations 116. The radio signals linked to the transceiver antenna 302 are coupled to a transceiver 304 comprising a conventional transmitter 301 and receiver 303. The radio signals received from the base stations 116 use conventional two and four-level FSK. It will be appreciated by one of ordinary skill in the art that the transceiver antenna 302 is not limited to a single antenna for transmitting and receiving radio signals. Separate antennas for receiving and transmitting radio signals would also be suitable.

Radio signals received by the transceiver 304 produce demodulated information at the output. The demodulated information is transferred over a signal information bus 305 which is coupled to the input of a processor 308, which processes the information in a manner well known in the art. Similarly, acknowledge response messages are processed by the processor 308 and delivered through the signal information bus 305 to the transceiver 304. The acknowledge response messages transmitted by the transceiver 304 are preferably modulated using four-level FSK operating at a bit rate of 800, 1200, 6400 or ninety-six-hundred bps. It will be appreciated that, alternatively, other bit rates and other types of modulation can be used as well.

The processor 308 preferably functions as the decoder and the encoder and is further programmed to receive an input requiring the selective call receiver to request a reserved time assignment from a controller (such as controller 112 of FIGS. 1 or 2) for a transmission of unscheduled information, the request to be sent on a reverse channel. Then unscheduled information could take many forms, including user initiated messages from the portable subscriber unit or just an "message read" confirmation back to the system controller. Then, the processor 308 determines whether a scheduled transmission is pending for transmission on the reverse channel during a scheduled time slot. The processor then sends the unscheduled information and an indicia of the scheduled transmission during the scheduled time slot if there is a scheduled transmission pending. The processor can be further programmed to send a request for the reserved time assignment for unscheduled information and programmed to receive an assigned time slot from the controller and send the unscheduled information during the assigned time slot if there is no scheduled transmission pending.

Preferably, the indicia of the scheduled transmission is a portion of an acknowledgement signal for receipt of a previous message or a negative acknowledgement signal for an inadequate receipt of a previous message by the selective call transceiver.

A power switch 306, coupled to the processor 308, is used to control the supply of power to the transceiver 304, thereby providing a battery saving function. A clock 309 is coupled to the processor 308 to provide a timing signal used to time various events as required in a synchronous protocol. The processor 308 also is preferably coupled to a electrically erasable programmable read only memory (EEPROM) 321 which comprises at least one selective call address 323 assigned to the portable subscriber unit (PSU) 122 and used to implement the selective call feature. The processor 308 also is coupled to a random access memory (RAM) 322 for storing one or more of the following: a message in a plurality of message storage locations 324 that was received at a particular time slot, a message sequence number (MSN) 330 corresponding to each of the messages stored in memory, a received signal strength indicator (RSSI) 332, an signal quality calibration (SQC) measurement 334, and a transmitter database that keeps track of the associated measurements to given transmitters. Of course, other information could be stored that would be useful in a two-way messaging system such as zone identifiers and general purpose counters to preferably count calls (to and from the portable subscriber unit).

The processor 308 also is coupled to a read-only memory (ROM) 310 comprising firmware elements for use by the processor 308. The firmware elements comprise a call processing element 311 for handling of incoming messages on the outbound channel. The call processing element 311 may further comprise routines to determine the current zone that the portable subscriber unit 122 is located in and procedures for updating the current zone identifier. In addition, the firmware elements may preferably include a zone comparator 315, and a registration process 316. Much of the programming that concerns the present invention could form part of the scheduler 314 and zone comparator 315, but other embodiments would certainly be contemplated within the scope of the present invention.

Typically, when an address is received by the processor 308, the call processing element 311 compares the received address with at least one selective call address(es) 323, and when a match is detected and a message has been received, a call alerting signal is preferably generated to alert a user that a message has been received. The call alerting signal is directed to a conventional audible or tactile alert device 318 coupled to the processor 308 for generating an audible or tactile call alerting signal. In addition, the call processing element 311 processes the message which preferably is received in a digitized conventional manner, and then stores the message in the message storage location 324 in the RAM 322. The message can be accessed by the user through conventional user controls 317 coupled to the processor 308, for providing functions such as reading, locking, and deleting a message. Alternatively, messages could be read through a serial port (not shown). For retrieving or reading a message, an output device 320, e.g., a conventional liquid crystal display (LCD), is also preferably coupled to the processor 308. It will be appreciated that other types of memory, e.g., EEPROM, can be utilized as well for the ROM 310 or RAM 322 and that other types of output devices, e.g., a speaker, can be utilized in place of or in addition to the LCD, particularly in the case of receipt of digitized voice.

The processor 308 preferably is implemented utilizing a microcomputer similar to the MC68HC11 series microcomputer, manufactured by Motorola, Inc. of Schaumburg, Ill. or other functionally equivalent Digital Signal Processor available from Motorola or Lucent Technologies. It will be appreciated that other similar microcomputers can be used as well for the processor 308, and that the ROM 310, the RAM 322, and/or the EEPROM 321 also can be included as a portion of the processor 308.

Figure 4:
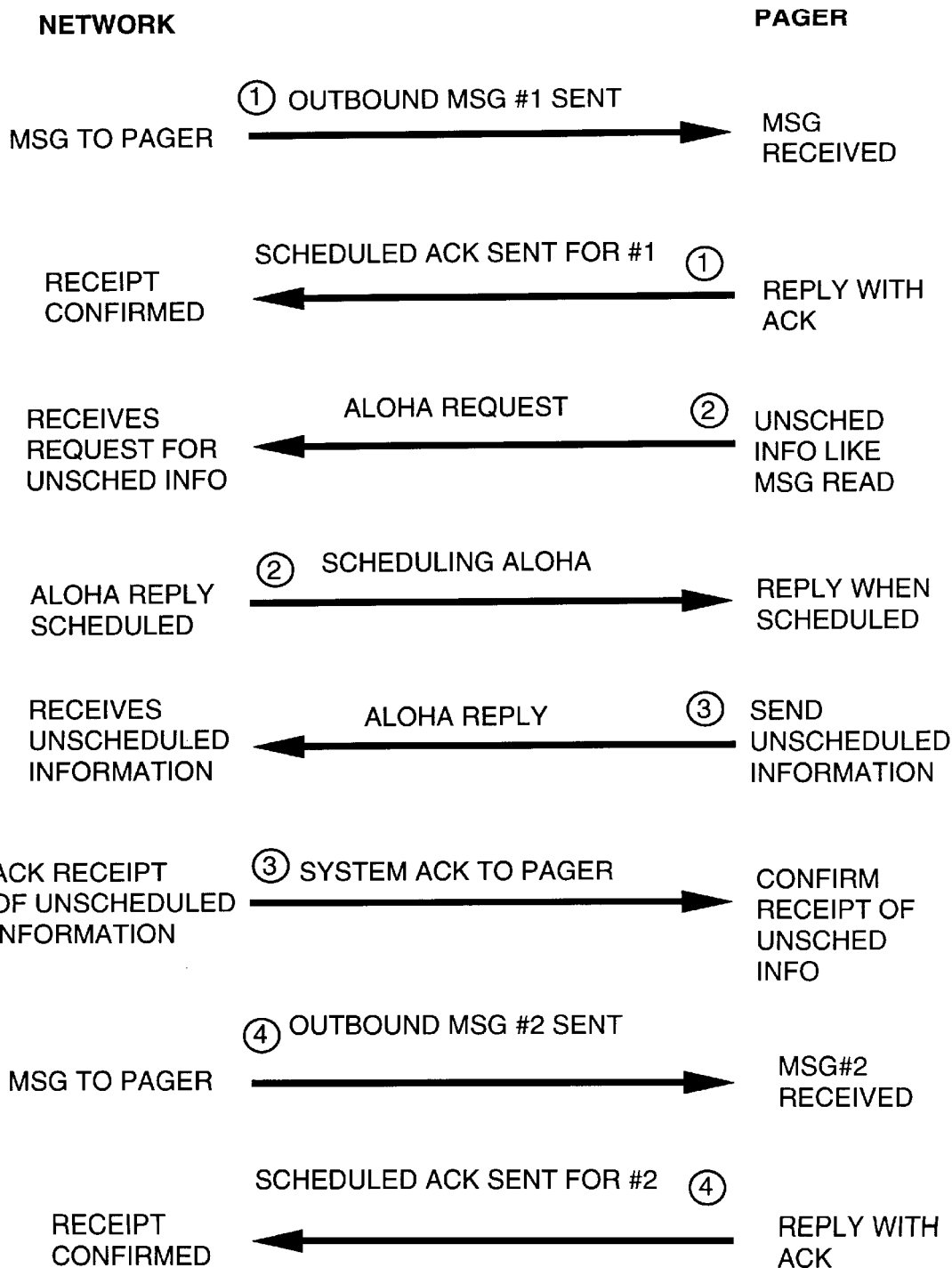
FIG. 4 is a diagram illustrating a method of sending unscheduled information in an existing communication system.
Figure 5:
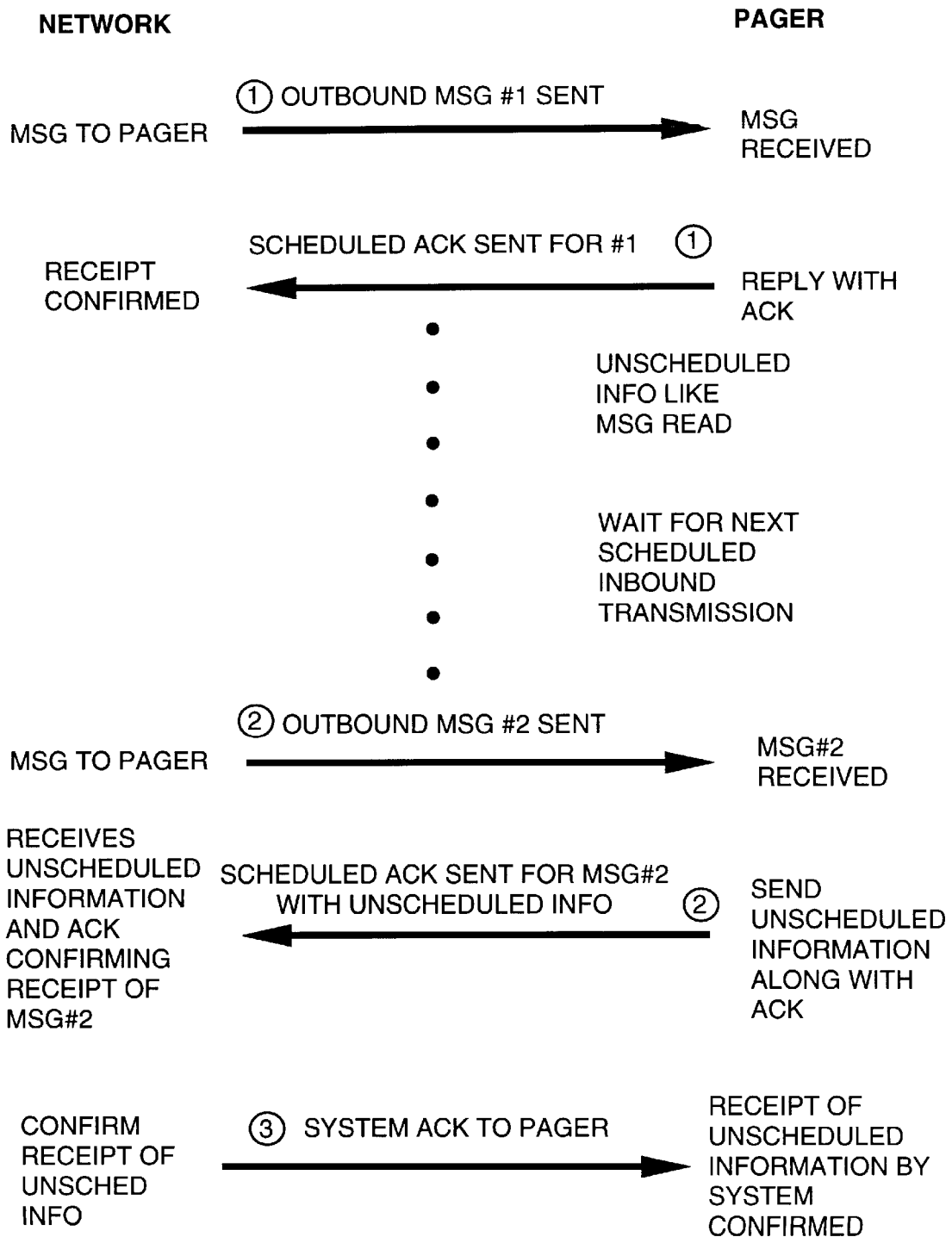
FIG. 5 is a diagram illustrating a method of sending unscheduled information in accordance with the present invention.

To more fully appreciate the benefits of the present invention, a comparison should be made between the diagrams of FIGS. 4 and 5 illustrating respectively a method of sending unscheduled information in an existing communication system and illustrating a method of sending unscheduled information in accordance with the present invention. With the present invention, inbound traffic from the pager back into the network is reduced at least by half in the examples shown where two outbound messages are sent and one inbound message with unscheduled information is sent to the network (or system controller). Additionally, note that there are further outbound capacity savings as well since fewer outbound messages are required to achieve the same result.

Referring to FIG. 4, a message is directed to a particular portable subscriber unit such as a two-way pager and a first outbound message is sent. The message would typically be received by the two-way pager and a scheduled acknowledgement is sent back to the controller confirming receipt of the first outbound message. If the two-way pager user initiates an unscheduled inbound message (such as a message indicating that the user has read the first message or any previous message or the user otherwise initiates a new inbound message), then the two-way pager must make an inbound request to schedule time to send the unscheduled information. Unscheduled information is also known as ALOHA information and requests are also known as ALOHA requests. Once the controller receives the ALOHA request, an outbound message is sent to the two-way pager scheduling an ALOHA reply dictating to the pager when to send the unscheduled information. At the assigned time, the two-way pager sends another inbound message with the unscheduled information. After the controller receives the unscheduled information, the controller sends another outbound message acknowledging receipt of the unscheduled information. At some point in time, the two-way pager may receive another (a second) outbound message and the two-way pager will confirm receipt by replying with another inbound acknowledgement. Thus, in accordance with an existing two-way system, 4 outbound messages and 4 inbound messages are sent to receive 2 confirmed outbound messages and send 1 confirmed inbound unscheduled message.

In contrast, with respect to FIG. 5 showing a diagram in accordance with the present invention, only 3 outbound messages and 2 inbound messages are required to achieve the same results, namely receiving 2 confirmed outbound messages and sending 1 confirmed inbound unscheduled message. In particular, FIG. 5 illustrates a first outbound message being sent and received by two-way pager which confirms receipt of the outbound message with an inbound acknowledgement message as described with reference to FIG. 4. Unlike FIG. 4, though, a two-way pager in accordance with the present invention would wait to send any unscheduled information until a next scheduled inbound message is due to be sent. Thus, the unscheduled information (such as a message read indication or any other user initiated inbound message) is sent along with a subsequent scheduled inbound message such as a scheduled inbound acknowledgement after a second outbound message was sent. Finally, the controller confirms receipt of the unscheduled information back to the two-way pager. In summary, 8 transactions are reduced to 5, wherein 4 outbound transactions are reduced to 3 transactions and more importantly 4 inbound transactions are reduced to 2 transactions.

Figure 6:
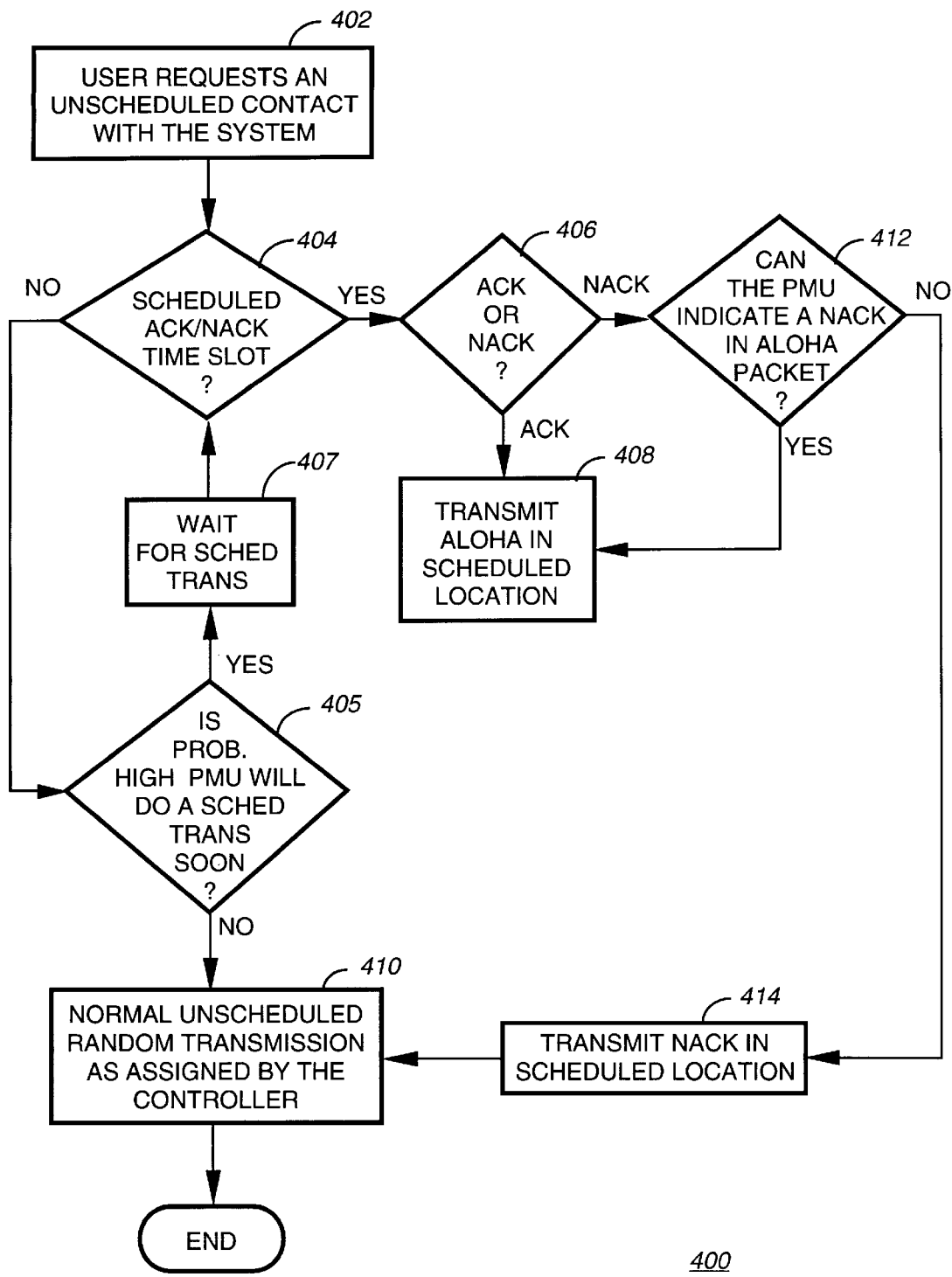
FIG. 6 is a flow chart illustrating a method of sending unscheduled information in accordance with the present invention.

Referring to FIG. 6, a flow chart is shown illustrating a method 400 of sending unscheduled information efficiently over a reverse channel in accordance with the present invention. At step 402, a user would request an unscheduled contact with the system or controller. A subscriber unit receiving such a request or input (like reading a message or a user sending a message) would normally require the subscriber unit to request a reserved time assignment from a system controller for a transmission of unscheduled information (an ALOHA packet), but the method preferably waits to have the subscriber unit determine whether a scheduled transmission is pending for transmission on the reverse channel during a scheduled time slot as shown at step 404. If there is a scheduled transmission pending for the reverse channel, then the subscriber unit would send the unscheduled information and preferably an indicia of the scheduled transmission during the scheduled time slot at step 408. Further inquiries can be done by the subscriber unit as desired, particularly if there are protocol restraints in sending a negative acknowledgement signal with an ALOHA packet. For instance, at step 406, the subscriber unit can check if the message received should be acknowledged (if received adequately) or negative acknowledged (if received inadequately). If a message is received adequately, the subscriber unit would simply send the acknowledgement or an indicia of the acknowledgement during its scheduled time slot along with the ALOHA packet or unscheduled information at step 408. If the message is received inadequately at step 406, a inquiry can then be made as to whether the subscriber unit can indicate a negative acknowledgement (NACK) with the ALOHA packet. If the subscriber unit can at decision block 412, then the NACK or an indicia of the NACK is transmitted in the scheduled time slot along with the ALOHA packet at step 408. If the subscriber unit cannot at decision block 412, then the NACK is sent in its scheduled time slot at step 414 and the ALOHA packet is then separately transmitted in the usual manner at step 410 (where a request is sent by the subscriber unit and the controller assigns a time slot for sending in the unscheduled information back into the system).

If there is no scheduled time slot for an ACK or a NACK pending, then the unscheduled information could simply be sent as described in FIG. 4, but preferably the method could make further inquiries or determinations before unnecessarily making further inbound transmissions. For instance, part of the inquiry whether a scheduled transmission is pending for transmission on the reverse channel during a scheduled time slot could further comprise the steps of determining whether a scheduled transmission will be pending in a nearby future time slot and holding the unscheduled information (the ALOHA packet) for a prescribed time period if there is a high probability of receiving an outbound message that requires a scheduled transmission as a reverse channel reply as shown in decision block 405. If the determination finds that an scheduled inbound transmission will be likely within a short time span, then the subscriber unit can wait at step 407 and then subsequently make a determination again as to whether a scheduled inbound transmission is pending. If no scheduled inbound transmissions exist and the probability is low that there is going to be one in the near future, then the subscriber could proceed to step 410 and operate as previously described. Looking at the probability of having a scheduled transmission in the near future is particularly useful in the cases where the subscriber unit has periods where it receives information services messages or where the unscheduled information is to be transmitted during peak periods where many outbound messages are being received by the subscriber unit.

It should be understood that the disclosed embodiments are merely examples and the invention is not restricted thereto. It will be understood by those skilled in the art that variations and modifications can be made within the scope and spirit of the present invention as defined by the appended claims.

What is claimed is:

1. A method of efficient reverse channel transmissions, comprising the steps at a subscriber unit of:

receiving an input that requires the subscriber unit to send a request for a reserved time assignment from a controller for a transmission of unscheduled information, the request to be sent on a reverse channel;

determining whether a scheduled transmission is pending for transmission on the reverse channel during a scheduled time slot; and sending the unscheduled information and an indicia of the scheduled transmission during the scheduled time slot if there is a scheduled transmission pending and thereby eliminating a need to request the reserved time assignment.

2. The method of claim 1, wherein the method further comprises the step of sending the request for the reserved time assignment for unscheduled information and receiving an assigned time slot from the controller and sending the unscheduled information during the assigned time slot if there is no scheduled transmission pending.

3. The method of claim 1, wherein the indicia of the scheduled transmission is a portion of an acknowledgement signal for receipt of a previous message by the subscriber unit.

4. The method of claim 1, wherein the indicia of the scheduled transmission is a portion of a negative acknowledgement signal for inadequate reception of a previous message by the subscriber unit.

5. The method of claim 1, wherein the unscheduled information is an inbound message indicating that a message has been read by a user.

6. The method of claim 1, wherein the step of determining whether a scheduled transmission is pending for transmission on the reverse channel during a scheduled time slot further comprises the steps of determining whether a scheduled transmission is pending in a nearby future time slot and holding for a prescribed time period the unscheduled information if there is a high probability of receiving an outbound message that requires a scheduled transmission as a reverse channel reply.

7. The method of claim 6, wherein the outbound message that requires a scheduled transmission as a reverse channel reply comprises an outbound information services transmission or an outbound message transmitted during a peak period for a particular user.

8. A method of efficient reverse channel utilization in a two-way wireless messaging system having a plurality of subscriber units, comprising the steps at one of the plurality of subscriber units of:

receiving an input requiring the one of the plurality of subscriber units to send a request for a reserved time assignment from a system controller for a transmission of unscheduled information, the request to be sent on a reverse channel;

determining whether a scheduled acknowledgement transmission is pending for transmission on the reverse channel during a scheduled time slot; and sending the unscheduled information and a portion of an indicia of the scheduled acknowledgement transmission during the scheduled time slot if there is a scheduled acknowledgement transmission pending.

9. The method of claim 8, wherein the method further comprises the step of sending a request for the reserved time assignment for unscheduled information and receiving an assigned time slot from the system controller and sending the unscheduled information during the assigned time slot if there is no scheduled acknowledgement transmission pending.

10. A selective call transceiver, comprising:

a receiver having a decoder;

a transmitter having an encoder; and a processor coupled to the decoder and the encoder, wherein the processor is programmed to:

receive an input requiring the selective call transceiver to send a request for a reserved time assignment from a controller for a transmission of unscheduled information, the request to be sent on a reverse channel;

determine whether a scheduled transmission is pending for transmission on the reverse channel during a scheduled time slot; and send the unscheduled information and an indicia of the scheduled transmission during the scheduled time slot if there is a scheduled transmission pending thereby eliminating a need to request the reserved time assignment.

11. The selective call transceiver of claim 10, wherein the processor is further programmed to send a request for the reserved time assignment for unscheduled information and receive an assigned time slot from the controller and send the unscheduled information during the assigned time slot if there is no scheduled transmission pending.

12. The selective call transceiver of claim 10, wherein the indicia of the scheduled transmission is a portion of an acknowledgement signal for receipt of a previous message by the selective call transceiver.

13. The selective call transceiver of claim 10, wherein the indicia of the scheduled transmission is a portion of a negative acknowledgement signal for inadequate reception of a previous message by the selective call transceiver.

14. The selective call transceiver of claim 10, wherein the unscheduled information is a reverse channel message indicating that a message has been read by a user.

15. A method of efficient reverse channel utilization in a communication system having a plurality of subscriber units wherein at least one of the plurality of subscriber units waits to determine whether a scheduled transmission is pending for transmission on a reverse channel during a scheduled time slot before transmitting unscheduled information, comprising the steps at a two-way messaging controller of:

awaiting scheduled transmissions from the plurality of subscriber units;

receiving unscheduled information and an indicia of the scheduled transmission during a scheduled time slot from the at least one of the plurality of subscriber units; and recognizing the unscheduled information upon decoding the indicia of the scheduled transmission.

16. The method of claim 15, wherein the method further comprises the step of receiving a request for a reserved time assignment for unscheduled information and transmitting an assigned time slot to the at least one of the plurality of subscriber units and receiving the unscheduled information during the assigned time slot if there is no scheduled transmission pending at the at least one of the plurality of subscriber units.

17. The method of claim 15, wherein the indicia of the scheduled transmission is a portion of an acknowledgement signal for receipt of a previous message by the at least one of the plurality of subscriber units.

18. The method of claim 15, wherein the indicia of the scheduled transmission is a portion of a negative acknowledgement signal for inadequate reception of a previous message by the at least one of the plurality of subscriber units.

* * * * *